United States Patent
Dudey (10) Patent No.: US 9,687,979 B2
(45) Date of Patent: Jun. 27, 2017

(54) TOOL SAFETY ACCESSORY

(71) Applicant: Tool Safe Products Ltd., Sherwood Park (CA)

(72) Inventor: Michael Dudey, Sherwood Park (CA)

( * ) Notice: Subject to any disclaimer, the term of this patent is extended or adjusted under 35 U.S.C. 154(b) by 0 days.

(21) Appl. No.: 13/708,334

(22) Filed: Dec. 7, 2012

(65) Prior Publication Data
US 2014/0158856 A1   Jun. 12, 2014

(51) Int. Cl.
| | |
|---|---|
| F16M 11/00 | (2006.01) |
| B25G 1/00 | (2006.01) |
| B25B 9/00 | (2006.01) |
| B25B 5/00 | (2006.01) |
| F16M 13/02 | (2006.01) |
| F16B 7/04 | (2006.01) |
| F16B 2/02 | (2006.01) |

(52) U.S. Cl.
CPC .......... *B25G 1/00* (2013.01); *B25B 5/00* (2013.01); *B25B 9/00* (2013.01); *F16B 2/02* (2013.01); *F16B 7/04* (2013.01); *F16M 13/02* (2013.01)

(58) Field of Classification Search
CPC ..... F16B 2/00; F16B 2/02; F16B 2/20; F16M 13/005; F16M 13/02; B25B 1/00; B25B 5/00; B25B 9/00
USPC ...... 248/689, 229.15, 229.25, 226.11, 228.6, 248/230.6, 231.71, 316.1, 316.7; 24/455, 24/563, 326, 344, 346; 81/487
See application file for complete search history.

(56) References Cited

U.S. PATENT DOCUMENTS

| | | | | |
|---|---|---|---|---|
| 2,202,000 A | * | 5/1940 | Gray | F41G 11/003 42/124 |
| 3,310,264 A | * | 3/1967 | Appleton | F16L 3/12 248/72 |
| D415,017 S | * | 10/1999 | Lo | D8/396 |
| 6,340,142 B1 | * | 1/2002 | Li | F16L 3/08 248/313 |
| 6,386,786 B1 | * | 5/2002 | Perlman | F16B 7/04 248/540 |
| 6,481,684 B1 | * | 11/2002 | Farmer | B60R 11/0241 248/225.11 |
| 2012/0074282 A1 | * | 3/2012 | Willey | B62D 65/06 248/226.11 |

* cited by examiner

*Primary Examiner* — Todd M Epps
(74) *Attorney, Agent, or Firm* — Richard D. Okimaw (57) ABSTRACT

There is disclosed a tool safety accessory configured to be securely attached to a handheld tool to provide an attachment point. In an embodiment, the tool safety accessory comprises a clamp configured to be adjustably secured to a handheld tool by means of one or more fasteners, wherein: the clamp includes an inner surface suitably shaped and sized to receive a body or handle of a handheld tool; the clamp is configured such that a first portion and a second portion of the clamp when fastened together by one or more fasteners form a gap when the clamp is fully fastened to the body or handle of the handheld tool; and the clamp includes an opening or hole for receiving a retaining means. The tool safety attachment may comprise a two-part clamp or one-part clamp made of a flexibly resilient reinforced plastic material.

7 Claims, 10 Drawing Sheets

TOOL SAFETY ACCESSORY

FIELD OF THE INVENTION

The present invention relates generally to a tool safety accessory for providing a secure attachment point for a handheld tool.

BACKGROUND

On construction sites, a common cause of injuries is heavy handheld tools (e.g. wrench or crowbar) being dropped by workers from heights which strike their co-workers below. There are a number of existing prior art solutions including specialized tools having built in attachment points. However, such tools may be expensive, difficult to find, or simply unavailable. Other prior art solutions rely on attachments that may not be secure, resulting in the possibility that they may not be effective.

What is needed is a solution which provides an adaptable, secure attachment point for a wide variety of tools at a relatively low cost.

SUMMARY

The present invention addresses the above described safety problem by providing a tool safety accessory which may be securely installed onto a wide variety of handheld tools.

In an aspect, a tool safety accessory comprises a clamp that may be adjustably secured to a handheld tool, such as a wrench or a crow bar, using one or more fasteners (e.g. threaded bolts and nuts). The tool safety accessory includes an opening or hole for receiving a retaining means, such as locking hook attached to a safety lanyard, a steel cable or a nylon rope, to prevent the tool from being accidentally dropped.

In an embodiment, the tool safety accessory comprises a two-part clamp which may be adjustably secured together by a plurality of fasteners. The two-part clamp includes inner surfaces suitably shaped and sized to receive the body or handle of a handheld tool, and to securely fasten the tool safety accessory around the body or handle of the handheld tool. The inner surfaces of the two-part clamp are provided with a plurality of angled surfaces adapted to hold a handheld tool at multiple points of contact around the body or handle of the handheld tool. The two-part clamp includes an opening providing an attachment point for a retaining means, such as a locking hook attached to a lanyard.

In another embodiment, the tool safety accessory comprises a one-part clamp having flexibly resilient jaws adapted to receive a body or handle of a handheld tool therein. The one-part clamp is adapted to be fastened at the ends of the jaws using a suitable fastener. The inner surfaces of the one-part clamp are provided with a plurality of protrusions or teeth which are designed to secure a body or handle of a handheld tool therebetween, when the one-part clamp is tightened. The tool safety accessory includes an opening providing an attachment point for a retaining means, such as a locking hook attached to a lanyard.

In another embodiment, the tool safety accessory is suitably sized such that it cannot pass through the openings of commonly sized steel grates, such that if the handheld tool is accidentally dropped, the tool safety accessory stops the tool from passing through the steel grate to a level below. Alternatively, the tool safety accessory may be attached to an obstructing member, such as a plastic ball attached to the tool safety accessory by a locking hook, such that the obstructing member prevents the attached handheld tool from passing through the openings of standard sized steel grates. Advantageously, even if the tool safety accessory is inadvertently not secured to a worker by suitable retaining means, the tool safety accessory still provides a degree of protection to co-workers working at levels below.

BRIEF DESCRIPTION OF THE DRAWINGS

The present invention will be better understood and objects of the invention will become apparent when consideration is given to the following detailed description thereof. Such description makes reference to the annexed drawings wherein.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

As noted above, the present invention relates to a tool safety accessory for providing a secure attachment point for a handheld tool.

Figure 1:
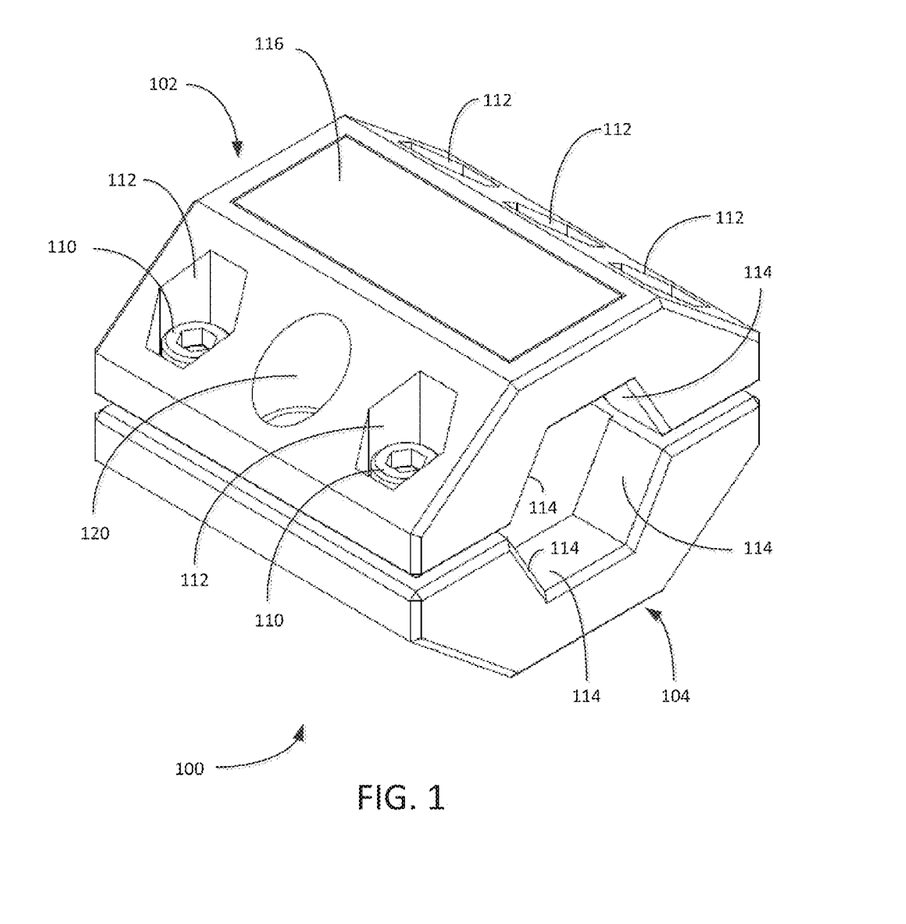
FIG. 1 shows a perspective view of a tool safety accessory in accordance with an embodiment.

Referring to FIG. 1, shown is a perspective view of a tool safety accessory 100 in accordance with an embodiment. As shown, tool safety accessory 100 includes a first portion 102 and a second portion 104 which are adapted to be fastened and brought together by a plurality of fasteners 110. The fasteners 110 may be received in a plurality of holes or apertures 112 appropriately sized to receive the fasteners 110. Tool safety accessory 100 further includes a plurality of inner surfaces 114 adapted to receive a body or handle of a handheld tool.

In an embodiment, inner surfaces 114 may be made of a suitable non-slip material such that tool safety accessory 100 can hold a tool therein tightly without slippage. For example, the inner surfaces 114 may be covered by a plastic or rubber surface to prevent slippage against a hard surface of a body or handle of a handheld tool.

In an embodiment, a labelling surface area 116 may be used to attach a label providing information relating to the tool safety accessory. For example, the label may provide sizing information, operating temperature, or weight capacity information.

Still referring to FIG. 1, tool safety accessory 100 further includes an opening 120 for receiving a retaining means, such as a locking hook attached to a lanyard (not shown). This opening 120 may also be used to attach, for example, a suitable steel wire or nylon rope which may be used to fasten the tool safety accessory 100 and the attached handheld tool to a retaining point, such as a belt or harness worn by the worker, or to another securing point such as a metal bar or hook.

In an embodiment, the tool safety accessory 100 may be manufactured from a suitably light metal material, or a reinforced plastic material with sufficient strength and resilience to be durable for a long service life when attached to a handheld tool. Preferably, the material provides a combination of strength and resilience in a wide range of operating temperatures as may be expected for outdoor use.

In an embodiment, a carbon-fibre-reinforced plastic material may be used to provide a tool safety accessory 100 that is light weight but with high strength and durability. The material for the tool safety accessory 100 should also be resistant to wear and fatigue, as the handheld tool to which it is attached may be subjected to repeated impacts or flexing and straining in use. Therefore, the tool safety accessory 100 is preferably resiliently flexible such that it can absorb repeated impacts on the handheld tool without undue wear or stress. Furthermore, by providing a degree of flexibility and resilience, the tool safety accessory 100 can be adjustably secured to a tool while minimizing undue stress that may be placed in the tool safety accessory 100 by over-tightening of fasteners 110. For example, without limiting the type of material that may be used, the material may be HDPE (Polyethylene), PTFE (Polytetrafluorothylene) Teflon, or CPVC (Chlorinated Poly Vinyl Chloride).

Figure 2:
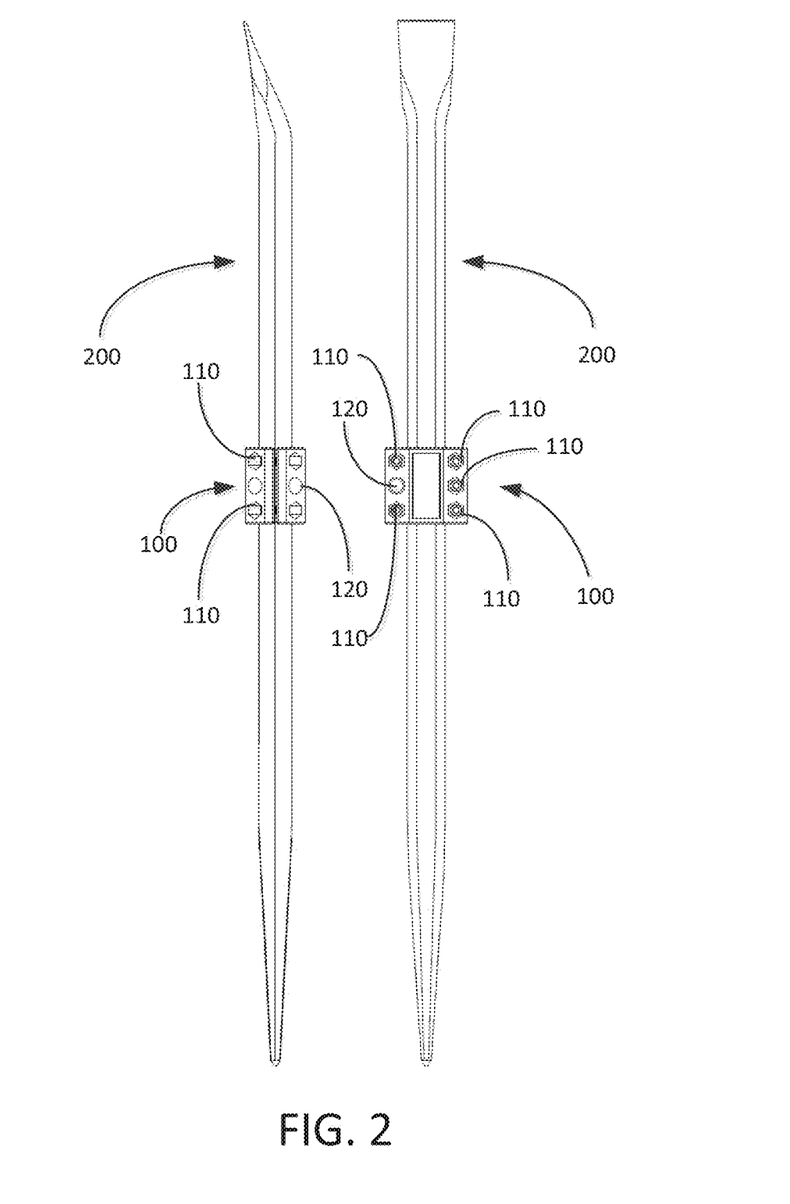
FIG. 2 shows side and top views of the tool safety accessory of FIG. 1 attached to a handheld tool.

Now referring to FIG. 2, shown is a side view and a front view of tool safety accessory 100 attached to a handheld tool 200. In this illustrative example, the handheld tool 200 is a crow bar having a generally hexagonal cross-section. In an embodiment, the inner surfaces of the tool safety accessory 100 are suitably shaped and sized to receive tool 200 and to securely attach to tool 200 by means of fasteners 110. Optionally, an insert (not shown) may be positioned between the inner surfaces of the tool safety accessory 100 and the handheld tool 200 to provide an additional layer of cushioning to assist with form fitting the tool safety accessory 100 around the handheld tool 200.

In an embodiment, fastener 110 may be a threaded bolt with a corresponding nut threaded onto one end. The nut may be a suitable locking-type nut which resists loosening under repeated impacts or vibration. A plurality of fasteners 110 may be used to securely attach tool safety accessory 100 to handheld tool 200.

In an embodiment, the tool safety accessory 100 is suitably shaped and sized such that the first portion 102 and second portion 104 of the tool safety accessory 100 form a gap and do not touch each other. This ensures that the tool safety accessory 100 is not loose on the handheld tool 200 when fasteners 110 are fully secured by tightening the nuts.

In an embodiment, an opening 120 formed on one side of the tool safety accessory 100 provides an attachment point for a retaining means, such as a locking hook attached to a lanyard, or alternatively a steel cable or nylon rope passed therethrough and attached at another end to a securing point.

Figure 3A:
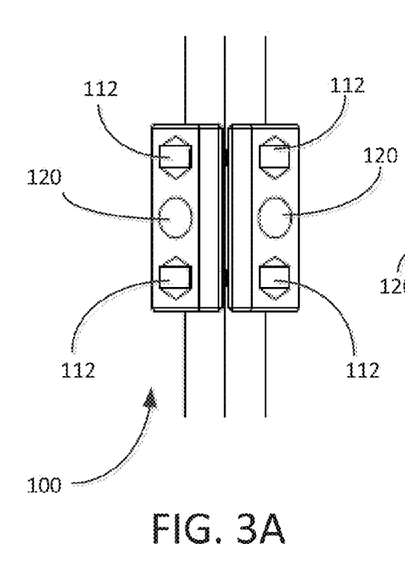
FIGS. 3A and 3B shows close up side and top views of the tool safety accessory of FIG. 1 attached to a handheld tool.
Figure 3B:
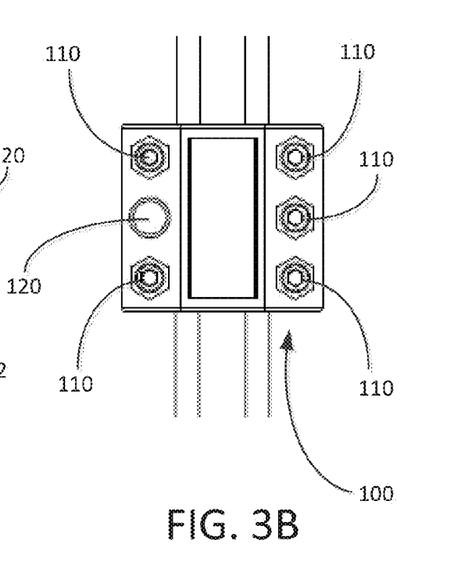
Figure 4:
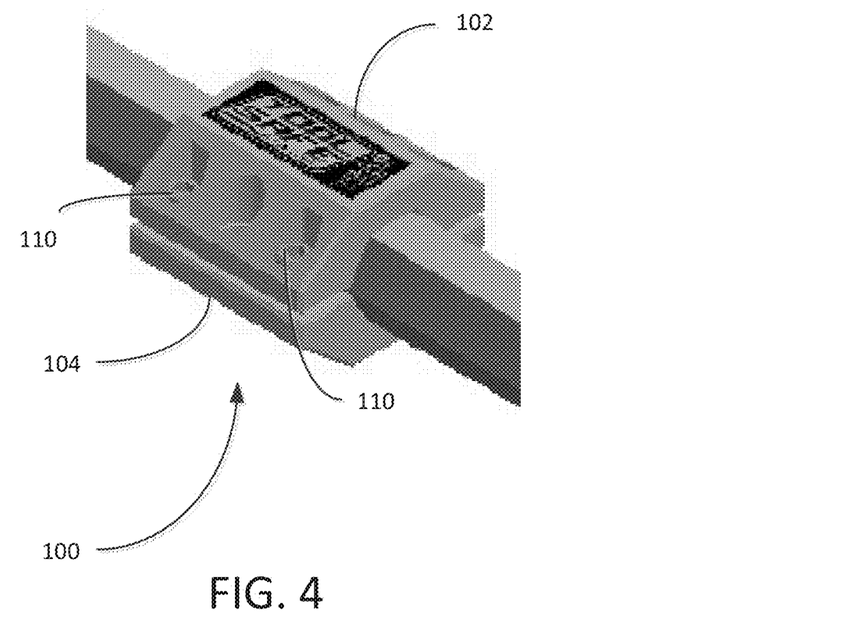
FIG. 4 shows a perspective view of the tool safety accessory of FIG. 1 attached to a handheld tool.

Now referring to FIGS. 3A and 3B, shown are close up side and top views, respectively, of the tool safety accessory 100 of FIG. 1, attached to a handheld tool 200. As shown in FIG. 3A, the side view of tool safety accessory 100 shows a slight gap formed between first and second portions 102, 104 of tool safety accessory 100 such that when fasteners 110 are fully tightened, the tool safety accessory 100 is attached securely to handheld tool 200. FIG. 4 shows another perspective view of the tool safety accessory of FIG. 1 attached to handheld tool 200 showing the gap.

Figure 5:
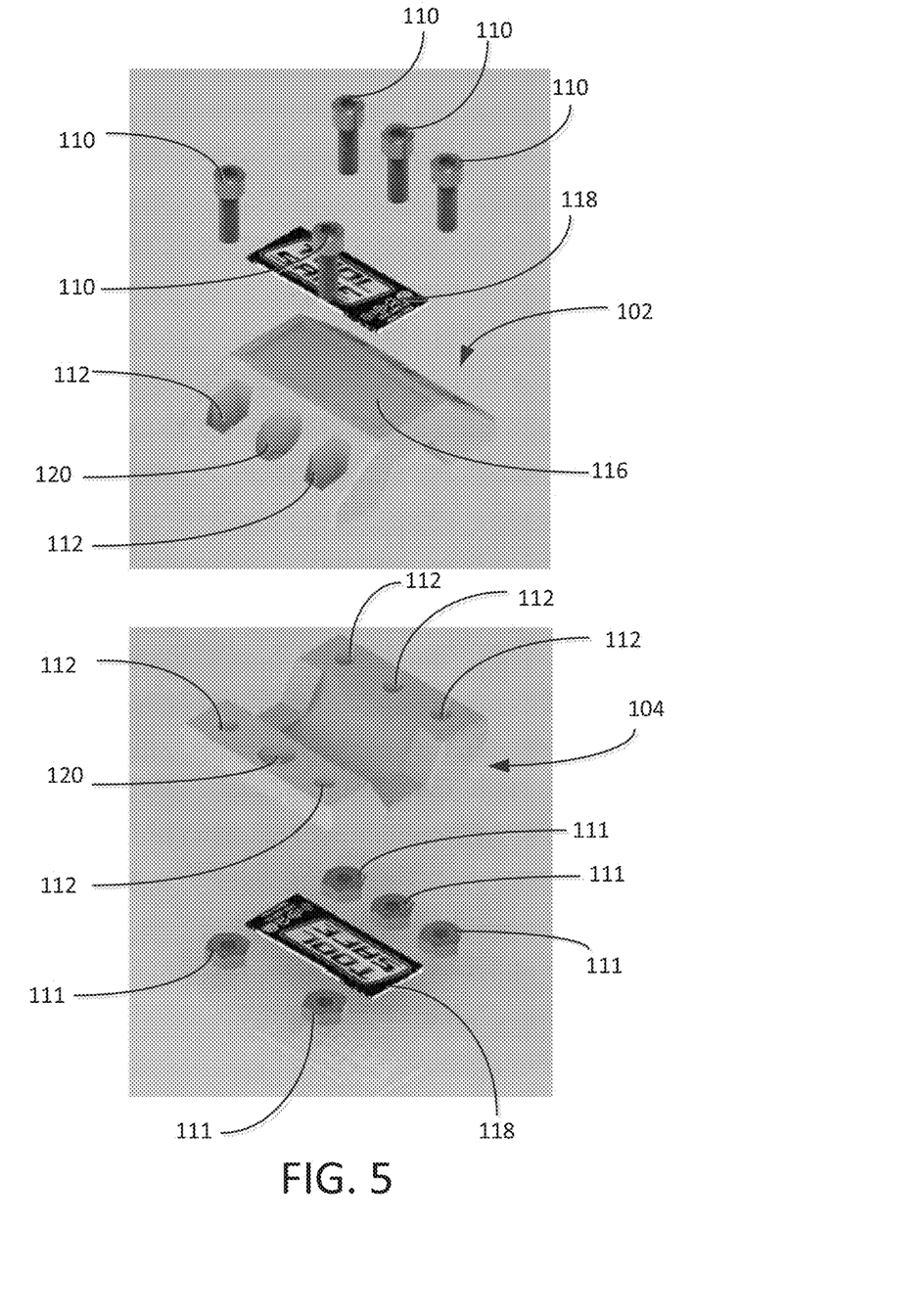
FIG. 5 shows an exploded perspective view of various components of the tool safety accessory of FIG. 1.

Now referring to FIG. 5, shown is an exploded perspective view of various components of the tool safety accessory 100 of FIG. 1. As shown, first and second portions 102 and 104 of the tool safety accessory 100 are provided with apertures 112 which are configured to align to receive fasteners 110 therethrough. In this illustrative example, fasteners 110 are threaded bolts with corresponding nuts 111 that may be screwed onto the bolts 112 and tightened to secure the first and second portions 102 and 104 of tool safety accessory 100 together. As previously mentioned, these nuts 111 may be a locking-type nut which resists loosening under repeated impacts or vibration.

Still referring to FIG. 5, label 118 is suitably adapted to be placed onto labelling surface area 116 on top of first portion 102. A corresponding labelling surface area may also be provided on the bottom of second portion 104 to allow a second label 118 to be placed onto the second labelling surface (not shown).

While FIGS. 1-5 show one possible embodiment of a tool safety accessory, it will be appreciated that other configurations are possible, as described below.

Figure 6:
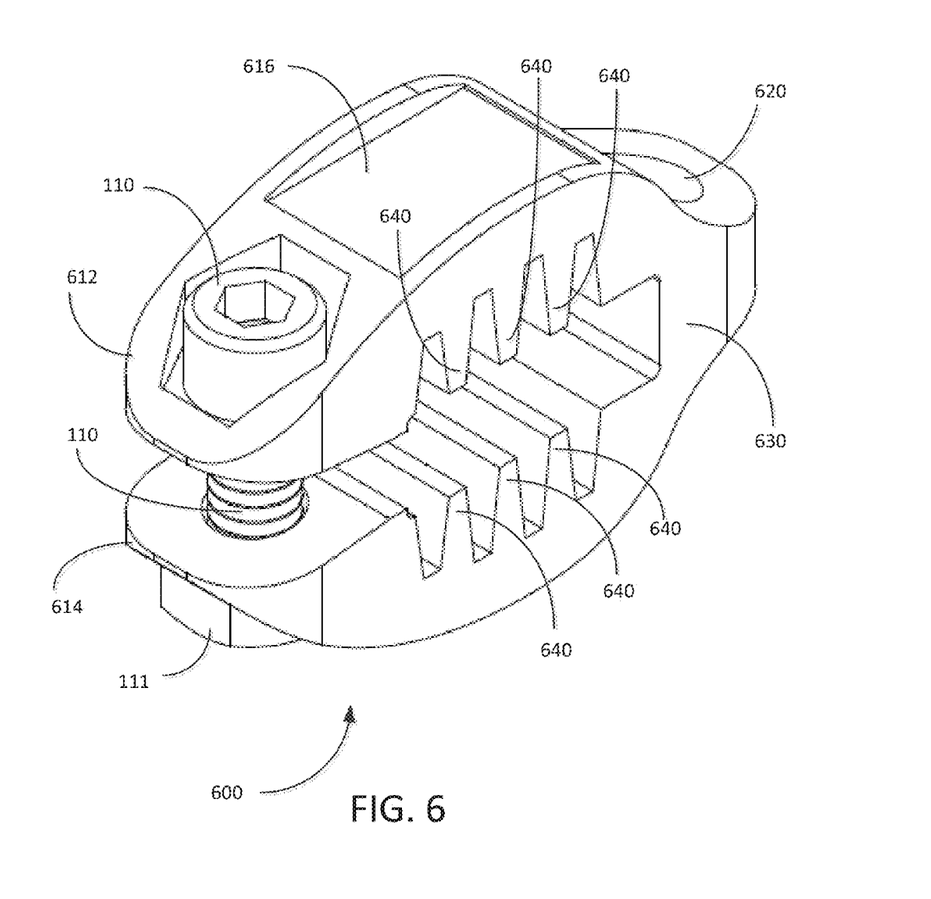
FIG. 6 shows a perspective view of a tool safety accessory in accordance with another embodiment.

Now referring to FIG. 6, shown is a perspective view of a tool safety accessory 600 in accordance with another embodiment. As shown, in this embodiment, tool safety accessory 600 is a one piece apparatus comprising flexibly resilient upper and lower jaws 612, 614 which are joined at a joint 630. Both upper and lower jaws 612, 614 may include a plurality of protrusions or teeth 640 which are adapted to securely hold a tool therebetween.

In an embodiment, the plurality of teeth 640 are made of a suitable flexibly resilient material such that they may conform to the shape of a body or handle of a tool held therebetween. Teeth 640 may also be provided with a suitable non-slip surface such that tool safety accessory 600 is held tightly with no slippage. For example, the non-slip surface may be a soft plastic, a rubber material, or a textured surface which resists slippage against another surface.

Again without limiting the type of material that may be used, the material may be HDPE, PTFE Teflon, or CPVC, for example.

As noted, upper and lower jaws 612, 614 are suitably flexibly resilient such that upper and lower jaws 612, 614 may be brought closer together using a fastener 110, in this case a threaded bolt together with a nut 111. Nut 111 may be a locking-type to resist loosening once secured.

Still referring to FIG. 6, as shown, an opening 620 provides an attachment point for a retaining means, such as a locking hook attached to a lanyard, or alternatively a steel cable or nylon rope that may be passed therethrough and attached at another end to a securing point.

In an embodiment, tool safety accessory 600 includes a labelling surface area 616 which may receive a suitably sized label. A corresponding labelling surface area may be provided on the bottom side of tool safety accessory 600 as well.

Figures 7A, 7B:
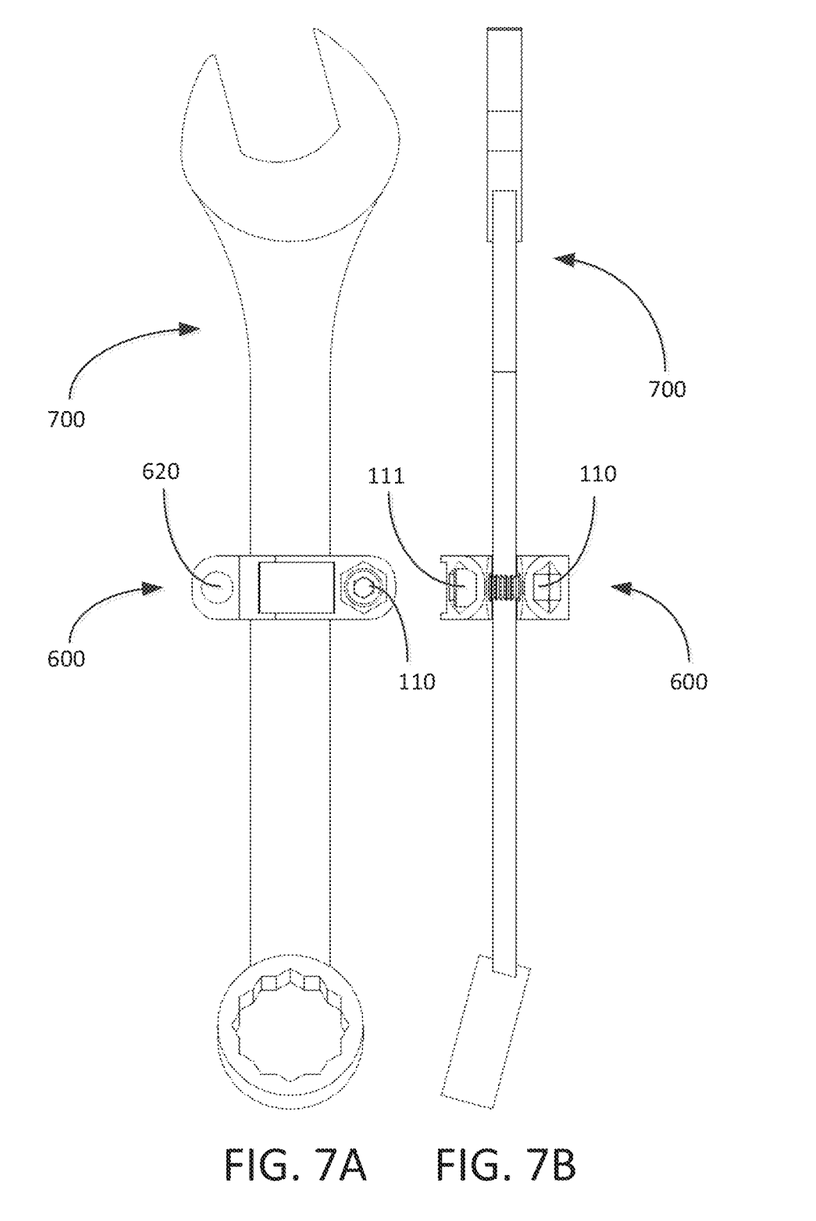
FIGS. 7A and 7B show top and side views of the tool safety accessory of FIG. 6 attached to a handheld tool.
Figure 8:
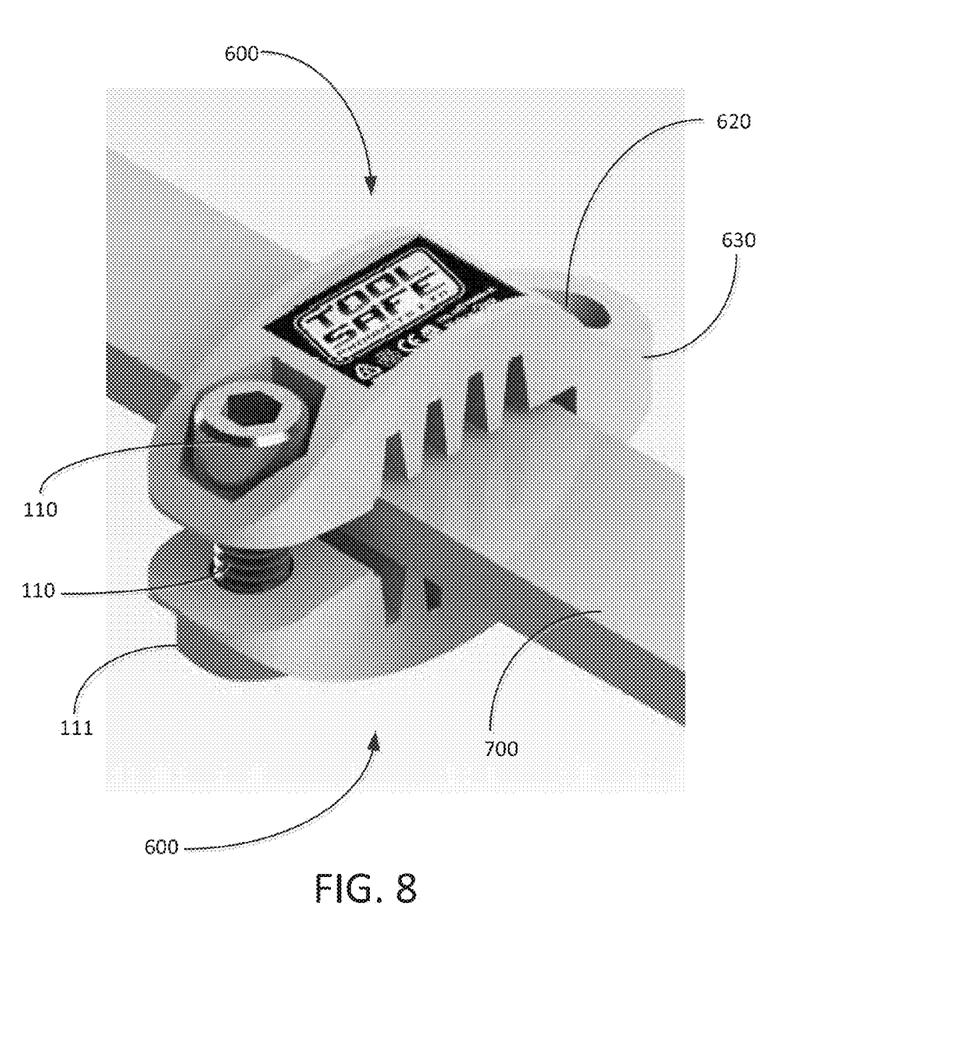
FIG. 8 shows a perspective view of the tool safety accessory of FIG. 6 attached to a handheld tool.

Now referring to FIGS. 7A and 7B, shown are top and side views, respectively, of the tool safety 600 accessory of FIG. 6 attached to a handheld tool 700, which is a wrench in this illustrative example. As shown, tool safety accessory 600 is securely fastened to handheld tool 700 by means of fastener 110. A perspective view of the tool safety accessory 600 of FIG. 6 attached to tool 700 is shown in FIG. 8.

Figure 9:
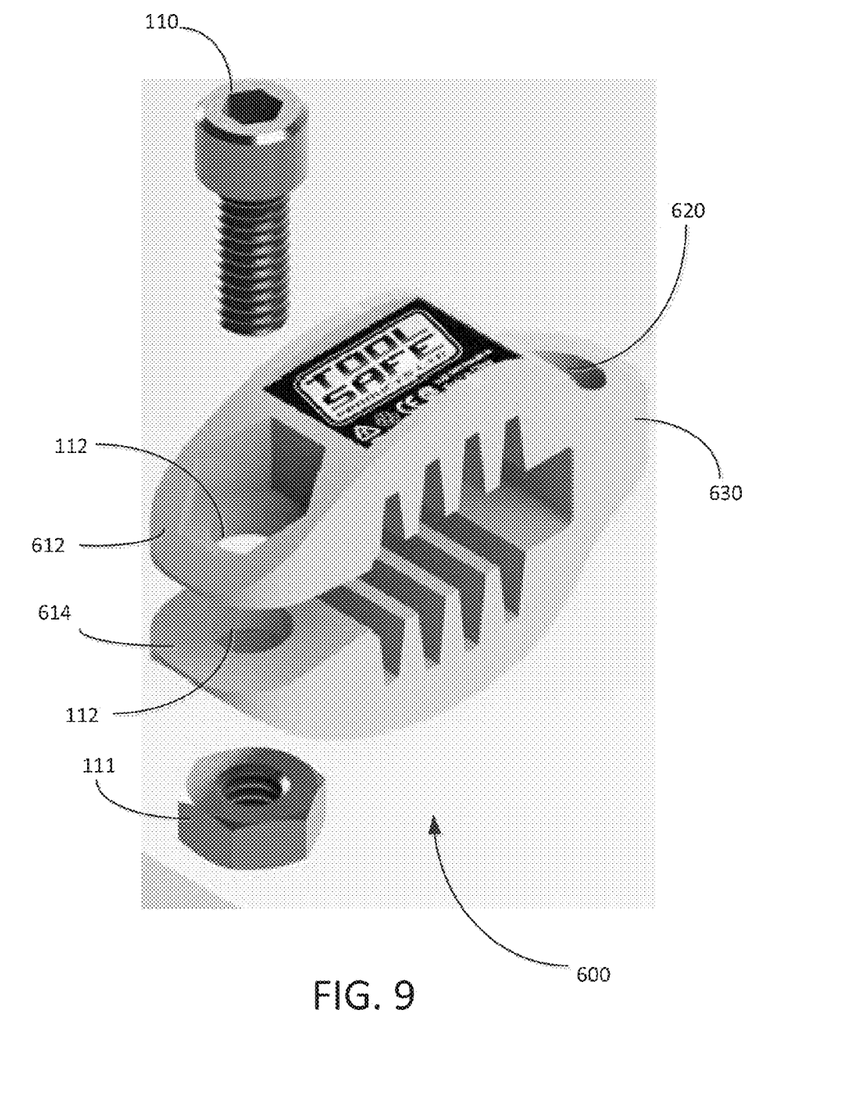
FIG. 9 shows an exploded perspective view of the tool safety accessory of FIG. 6.

Now referring to FIG. 9, shown is an exploded perspective view of the tool safety accessory 600 of FIG. 6. As shown, fastener 110 is adapted to be received through aligned apertures 112 provided in the upper and lower jaws 612, 614 of tool safety accessory 600. When fastener 110, which in this case is a threaded bolt, is mated with a locking nut 111 which is then tightened, tool safety apparatus 600 provides a secure attachment point 620 for handheld tool 700.

Figure 10:
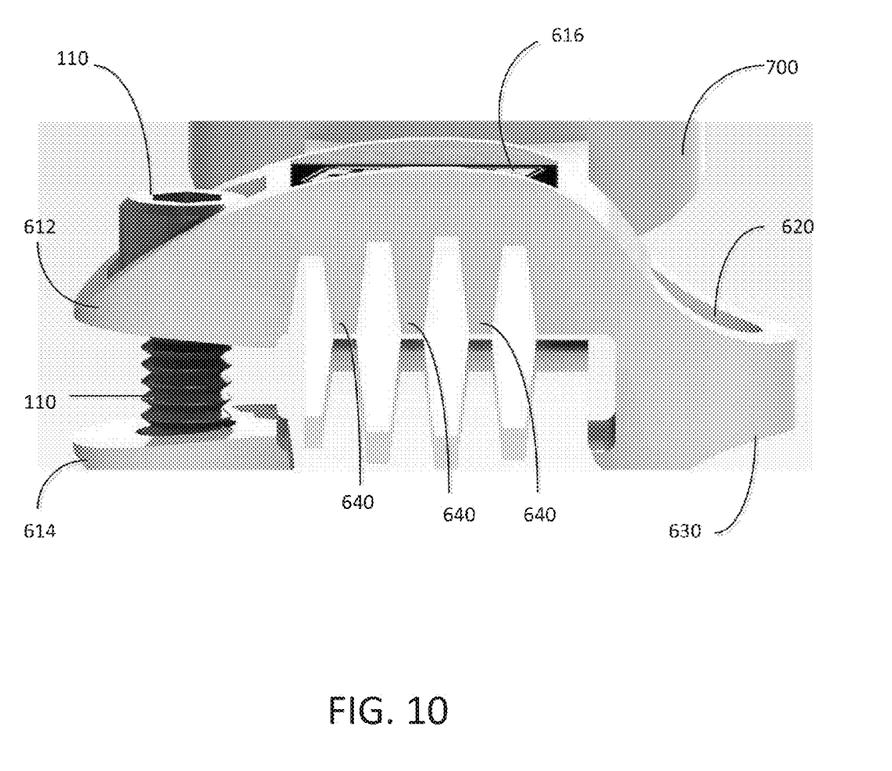
FIG. 10 shows a close up side view of the tool safety accessory of FIG. 6.

As shown in FIG. 10, with fastener 110 securely tightening upper and lower jaws 612, 614 together, tool 700 is held tightly between the plurality of teeth 640 provided in the upper and lower jaws 612, 614 of tool safety accessory 600. Suitable non-slip material may cover the teeth 640 ensure that tool safety apparatus is tightly fastened with no slippage on handheld tool 700.

In an embodiment, tool safety accessory 600 may be suitably sized such that tool safety accessory 600 cannot pass through commonly sized steel grates. In the construction industry, a standard recommended grading for steel grates is Type 19-4 with openings sized at 4 inches in length by 1 and 3/16 inches in width. Therefore, in one embodiment, the tool safety accessory 600 (also 100 from FIG. 1) would have dimensions that are larger than 1 and 3/16 inches in any dimension. To provide a suitable safety margin, the tool safety accessory 100, 600 can be sized to have a minimum dimension of 1" in any direction. Thus, even if tool safety accessory 600 is not connected to a securing point, tool safety accessory 600 prevents handheld tool 700 from inadvertently being dropped through openings in a steel grate to co-workers working in lower levels.

Alternatively, the tool safety accessory may be attached to an obstructing member, such as a plastic ball attached to the tool safety accessory by a locking hook, such that the obstructing member prevents the attached handheld tool from passing through the openings of standard sized steel grates. Advantageously, even if the tool safety accessory is inadvertently not secured to a worker by suitable retaining means, the tool safety accessory still provides a degree of protection to co-workers working at levels below.

Thus, in an aspect, there is provided a tool safety accessory, comprising: a clamp configured to be adjustably secured to a handheld tool by means of one or more fasteners, wherein: the clamp includes an inner surface suitably shaped and sized to receive a body or handle of a handheld tool; the clamp is configured such that a first portion and a second portion of the clamp when fastened together by one or more fasteners form a gap when the clamp is fully fastened to the body or handle of the handheld tool; and the clamp includes an opening or hole for receiving a retaining means.

In an embodiment, the clamp is a two-part clamp with each part configured to be secured together by a plurality of fasteners.

In another embodiment, the inner surface of the clamp is shaped to conform to a cross-section of the body or handle of the handheld tool, such that the inner surface substantially contacts the body or handle of the handheld tool on all sides.

In another embodiment, the first portion and a second portion of the clamp are configured to be fastened together by a plurality of threaded bolts secured by locking nuts.

In another embodiment, the clamp includes an attachment point for receiving a retaining means.

In another embodiment, the attachment point is an opening or hole formed in both parts of the two-part clamp suitable for receiving a locking hook attached to a lanyard.

In another embodiment, the clamp is a one-part clamp with upper and lower jaws joined together at a joint at a first end, and configured to receive at least one fastener to secure the upper and lower jaws at a second end.

In another embodiment, the inner surface of the clamp comprises a plurality of protrusions or teeth configured to secure a body or handle of a handheld tool therebetween.

In another embodiment, the teeth are a suitable flexibly resilient material such that the teeth conform to the shape of a body or handle of a tool held therebetween on all sides.

In another embodiment, the second end of the clamp is adapted to be securely fastened by a threaded bolt and a locking nut.

In another embodiment, the clamp includes an attachment point at the joint for receiving a retaining means.

In another embodiment, the attachment point comprises an opening or hole suitable for receiving a locking hook attached to a lanyard.

In another embodiment, the clamp is configured and sized to exceed the size of a standard steel grate when fully fastened to the body or handle of the handheld tool.

In another embodiment, the material of the clamp comprises a suitably light metal material or a reinforced plastic material.

In another embodiment, the material is one of HDPE (Polyethylene), PTFE (Polytetrafluorothylene) Teflon, or CPVC (Chlorinated Poly Vinyl Chloride).

While illustrative embodiments have been described above by way of example, it will be appreciated that various changes and modifications may be made without departing from the scope of the invention, which is defined by the following claims.

The invention claimed is:

1. A tool safety accessory, comprising:
a clamp formed of first and second portions with a joint portion therebetween having first and second sides adjacent to each of said respective first and second portions of said clamp, said clamp having a gap between said first and second portions opposite said joint portion, said clamp being configured to be adjustably secured to a handheld tool by at least one fastener bridging said gap, wherein:
the clamp includes an inner surface suitably shaped and sized to receive a body or handle of the handheld tool, said inner surface extending along an arcuate path on each of said first and second portions concavely oriented towards each other defining a tool receiving opening;
a plurality of teeth extending from each side of said inner surface towards an opposite side of said inner surface, said plurality of teeth from said each side of said inner surface along paths parallel to each other to a common height so as to form a rectangular shaped opening wherein distal ends of said teeth on said each side of said inner surface define planes parallel to each other;
the clamp is configured such that said first portion and said second portion of the clamp when fastened together by said at least one fastener form said gap when the clamp is fully fastened to the body or handle of the handheld tool; and
the clamp includes an attachment point comprising a closed hole extending along an attachment path completely through said joint portion between said first and second sides of said joint portion, said hole being adapted to receive an attachment therethrough wherein said attachment path extends along a path which is perpendicular to a path formed by said inner surface and entirely outside of said tool receiving opening along all points of said attachment path.

2. The tool safety accessory of claim 1, wherein the teeth are a suitable flexibly resilient material such that the teeth conform to the shape of a body or handle of a tool held therebetween on all sides.

3. The tool safety accessory of claim 1, wherein the second end of the clamp is adapted to be securely fastened by a threaded bolt and a locking nut.

4. The tool safety accessory of claim 1, wherein the opening or hole at the attachment point is adapted to receive a locking hook therethrough, the locking hook attached to a lanyard.

5. The tool safety accessory of claim 1, wherein the clamp is configured and sized to exceed a size of a standard steel grate when fully fastened to the body or handle of the handheld tool.

6. The tool safety accessory of claim 1, wherein the clamp comprises a material which is a light metal material or a reinforced plastic material.

7. The tool safety accessory of claim 1, wherein the clamp comprises a material which is one of HDPE (Polyethylene), PTFE (Polytetrafluoroethylene) Teflon, or CPVC (Chlorinated Poly Vinyl Chloride).

* * * * *